(12) United States Patent
Phoenix et al.

(10) Patent No.: US 10,646,996 B2
(45) Date of Patent: May 12, 2020

(54) METHODS FOR ESTABLISHING AND UTILIZING SENSORIMOTOR PROGRAMS

(71) Applicant: Vicarious FPC, Inc., Union City, CA (US)

(72) Inventors: David Scott Phoenix, Union City, CA (US); Michael Stark, Union City, CA (US); Nicholas Hay, Union City, CA (US)

(73) Assignee: Vicarious FPC, Inc., Union City, CA (US)

( * ) Notice: Subject to any disclaimer, the term of this patent is extended or adjusted under 35 U.S.C. 154(b) by 0 days.

(21) Appl. No.: 16/043,146

(22) Filed: Jul. 23, 2018

(65) Prior Publication Data
US 2019/0039239 A1     Feb. 7, 2019

Related U.S. Application Data

(60) Provisional application No. 62/535,703, filed on Jul. 21, 2017.

(51) Int. Cl.
| | | |
|---|---|---|
| *B25J 9/16* | (2006.01) | |
| *G06N 3/08* | (2006.01) | |
| *G06N 5/00* | (2006.01) | |
| *G06K 9/62* | (2006.01) | |
| *G06N 3/04* | (2006.01) | |
| *G06N 3/00* | (2006.01) | |
| *G05B 13/02* | (2006.01) | |

(52) U.S. Cl.
CPC ............... *B25J 9/163* (2013.01); *B25J 9/161* (2013.01); *G05B 13/027* (2013.01); *G06K 9/6265* (2013.01); *G06K 9/6268* (2013.01); *G06K 9/6297* (2013.01); *G06N 3/008* (2013.01); *G06N 3/0454* (2013.01); *G06N 3/08* (2013.01); *G06N 5/003* (2013.01)

(58) Field of Classification Search
CPC ......... B25J 9/163; B25J 9/161; G06K 9/6265; G06K 9/6268; G06K 9/6297; G06N 3/08; G06N 5/003; G06N 3/008; G06N 3/0454; G05B 13/027
See application file for complete search history.

(56) References Cited

U.S. PATENT DOCUMENTS

| | | | |
|---|---|---|---|
| 2004/0049124 A1 | 3/2004 | Kullok et al. | |
| 2007/0011631 A1* | 1/2007 | Fine ............... | G01R 31/318357 716/105 |

(Continued)

OTHER PUBLICATIONS

Marcos et al., "Learning Sensorimotor Abstractions.", Nov. 1-20, 2010, final project, Aalto University, pp. 1-67 (Year: 2010).*

(Continued)

*Primary Examiner* — Hal Schnee
*Assistant Examiner* — Brent Johnston Hoover
(74) *Attorney, Agent, or Firm* — Jeffrey Schox; Diana Lin

(57) ABSTRACT

A method for establishing sensorimotor programs includes specifying a concept relationship that relates a first concept to a second concept and establishes the second concept as higher-order than the first concept; training a first sensorimotor program to accomplish the first concept using a set of primitive actions; and training a second sensorimotor program to accomplish the second concept using the first sensorimotor program and the set of primitive actions.

17 Claims, 2 Drawing Sheets

100

Generating a Sensorimotor Training Curriculum S110

Specifying A Concept Relationship S120

Training a First SMP S130

Training a Second SMP using the First SMP S140

Executing First and Second SMPs S150

(56) References Cited

U.S. PATENT DOCUMENTS

2010/0164596 A1* 7/2010 Olexenko .................. G06F 7/49
327/361
2014/0277744 A1* 9/2014 Coenen .................... B25J 9/163
700/264
2016/0096272 A1 4/2016 Smith et al.

OTHER PUBLICATIONS

Stramandinoli et al., "The grounding of higher order concepts in action and language: a 1-20 cognitive robotics model." Nov. 10, 2011, Neural Networks, pp. 1-25 (Year: 2011).*
Bengio et al., "Curriculum Learning", Jun 14-18, 2009, ICML '09 Proceedings of the 26th Annual International Conference on Machine Learning, pp. 1-8 (Year: 2009).*
Gogate et al., "A New Algorithm for Sampling CSP Solutions Uniformly at Random", 2006, International Conference on Principles and Practice of Constraint Programming, pp. 1-15 (Year: 2006).*
Cohen et al. "Neo: Learning conceptual knowledge by sensorimotor interaction with an 1-20 environment." In: Proceedings of the first international conference on Autonomous agents. Feb. 8, 1997 (Feb. 8, 1997).
International Search Report and Written Opinion for PCT Application No. PCT/US2018/043350.
Marcos. "Learning Sensorimotor Abstractions.", final project, Aalto University 24 Nov. 1-20, 2010 (Nov. 24, 2010).
Stramandinoli et al. "The grounding of higher order concepts in action and language: a 1-20 cognitive robotics model." In: Neural Networks. Nov. 10, 2011 (Nov. 10, 2011).

* cited by examiner

METHODS FOR ESTABLISHING AND UTILIZING SENSORIMOTOR PROGRAMS

CROSS-REFERENCE TO RELATED APPLICATIONS

This application claims the benefit of U.S. Provisional Application Ser. No. 62/535,703, filed on 21 Jul. 2017, which is incorporated in its entirety by this reference.

TECHNICAL FIELD

This invention relates generally to the artificial intelligence field, and more specifically to new and useful methods for establishing and utilizing sensorimotor programs.

BACKGROUND

While computer vision remains a complex problem in artificial intelligence, recent achievements such as the recursive cortical network (RCN) have enabled computers to identify objects from visual data efficiently and with high accuracy. However, just as with human vision, object recognition is only a part of the skillset needed to effectively interact with an environment. Humans may observe how objects interact with each other to infer properties of those objects; for example, by observing how a sphere reacts when dropped onto a hard surface, a human may be able to infer whether a ball is made of rubber, cork, or steel. Often, this observation occurs as a result of direct interaction with the environment; e.g., a human intentionally drops a ball onto a hard surface (or squeezes the ball, etc.) as an alternative to passively waiting for the environment to produce such a situation naturally. This knowledge makes it easier to accurately interpret past events, and likewise, to predict future events. Unfortunately, traditional approaches to computer vision more often embody the approach of the passive observer, which restricts their ability to achieve comprehension of an environment in a complete and generalizable sense. Thus, there is a need in the artificial intelligence field to create new and useful methods for establishing and utilizing sensorimotor programs. This invention provides such new and useful methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. Method for Establishing Sensorimotor Programs

Figure 1:
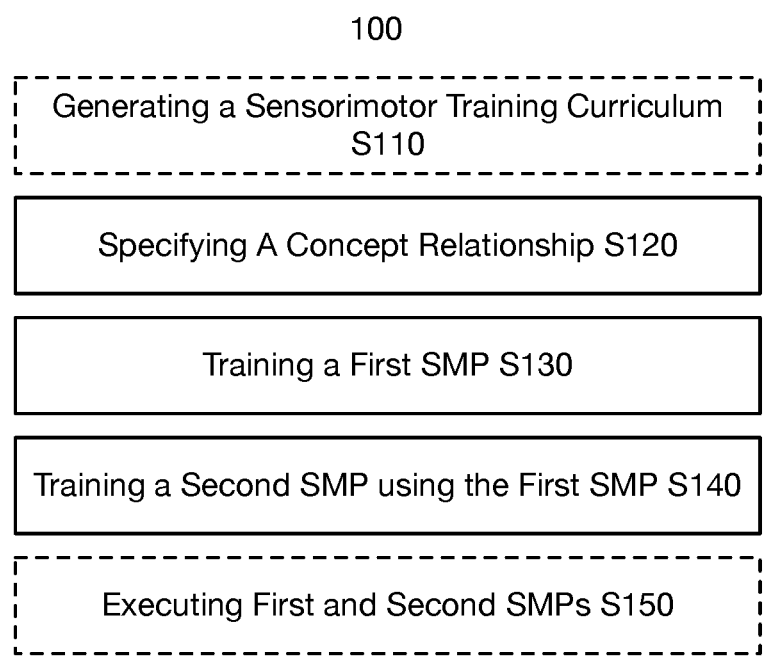
FIG. 1 is a chart representation of a method of an invention embodiment.
Figure 2:
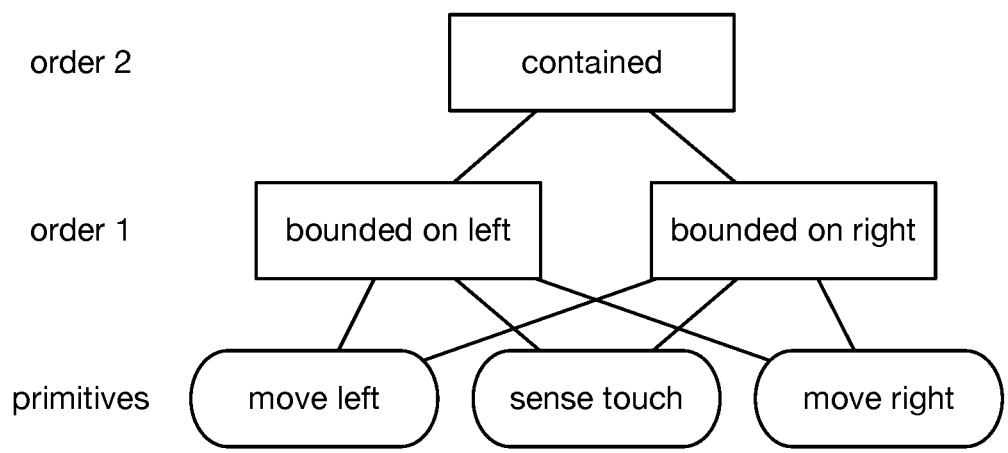
FIG. 2 is a chart representation of a concept hierarchy of a method of an invention embodiment.

A method 100 for establishing sensorimotor programs includes specifying a concept relationship S120, training a first sensorimotor program S130 and training a second sensorimotor program using the first sensorimotor program S140, as shown in FIG. 1. The method 100 may additionally or alternatively include generating a sensorimotor training curriculum S110 and/or executing the first and second sensorimotor programs S150.

As discussed in the background section, traditional approaches to computer vision often focus on systems and methods that derive information from their environments in a passive manner. For example, a computer vision system for an autonomous vehicle might be trained to distinguish various objects based on their visual characteristics as observed by a camera. While this approach to computer vision is straightforward, it often suffers from two disadvantages. The first is that sensory input is useful to distinguish objects or environmental states only to the extent that the sensory input differs substantially between those objects and environmental states. For example, a computer that identifies objects based on similarity of appearance may have trouble distinguishing objects that appear to be similar; e.g., such a computer may not be able to distinguish a person from a statue. Some computer vision approaches attempt to solve this issue by taking more data (e.g., different sensor types or attempting to infer indirectly sensed information such as inferring physical properties of an object from its movement), but these approaches have drawbacks as well. The second issue is that this approach results in poor generalizability; e.g., it can be difficult to figure out how to treat a new detected object based solely on similarity to trained objects. For example, if a robot is trained to interact with a pen in a certain way, that may not accurately inform the robot how to interact with a laser pointer (even though pens and laser pointers may look quite similar).

To address these problems, some researchers have turned toward models of perception used to describe the behavior exhibited by natural consciousnesses (e.g., those of animals and humans). One such model is the sensorimotor theory of perceptual consciousness. This theory attempts to explain the perception of "feel" as arising from an agent engaging in a particular sensorimotor skill and attending to the fact that they are engaged in exercising that skill. It follows from this theory that the quality of a sensation is based on the way an agent interacts with its environment and not solely based on passive observation.

This reflects the real-world behavior of many animals when placed into new environments. Often, animals interact with their environments in what at first may appear to be random ways. The result of their behavior leads to environmental feedback that either reward or punish the behavior; the link established between the feedback (e.g., sensory cues) and the behaviors (e.g., exploratory motor actions) may be referred to as a sensorimotor contingency. Over time, animals refine their behavior to attain rewards while avoiding punishment (reinforcement learning). The process of establishing sensorimotor contingencies is part of "exploration", and the use of them after establishment is known as "exploitation".

Animals may utilize exploration and exploitation efficiently: when encountering a new environment, animals explore the environment until finding a rewarding set of behaviors. Once a rewarding set of behaviors is established, animals may continue to exploit the behaviors as long as they continue being rewarding. If a set of behaviors ceases to be rewarding, animals may then resume the process of exploration.

While reinforcement learning in general has been studied extensively in the context of machine learning, applications utilizing sensorimotor contingencies are far less common. Further, most of these applications utilize relatively simple reinforcement learning strategies (e.g., learning solely via random exploration). This can limit the efficiency and/or generalizability of these applications.

In contrast, the method 100 focuses on the establishment of sensorimotor programs that build upon previously established sensorimotor programs to learn new behavior. By utilizing existing sensorimotor programs in the training process, the method 100 may more quickly learn complex behaviors than would otherwise be possible. Further, to the extent that the method 100 includes environment generation (a la S110), the method 100 may additionally exploit this advantage by intentionally generating environments in a manner reflecting the role of particular simple concepts in representing more complex concepts. Further, the sensorimotor programs generated by the method 100 may feature enhanced generalizability compared to traditional approaches thanks to hierarchical relationships between concepts (this may also be thought of as an advantage for S150).

The method 100 is preferably implemented by a partially observable Markov decision process (POMDP) operating on a neural network. Neural networks and related systems, including recursive cortical networks (RCNs), convolutional neural networks (CNNs), hierarchical compositional networks (HCNs), HMAX models, Slow Feature Analysis (SFA) systems, and Hierarchical Temporal Memory (HTM) systems may be used for a wide variety of tasks that are difficult to complete using standard rule-based programming. These tasks include many in the important fields of computer vision and speech recognition.

Neural networks and related systems can be represented as distributed processing elements that implement summation, multiplication, exponentiation or other functions on the elements incoming messages/signals. Such networks can be enabled and implemented through a variety of implementations. For example, a system operating the method 100 may be implemented as a network of electronically coupled functional node components. The functional node components can be logical gates arranged or configured in a processor to perform a specified function. As a second example, the system may be implemented as a network model programmed or configured to be operative on a processor. The network model is preferably electronically stored software that encodes the operation and communication between nodes of the network. Neural networks and related systems may be used in a wide variety of applications and can use a wide variety of data types as input such as images, video, audio, natural language text, analytics data, widely distributed sensor data, or other suitable forms of data.

As described previously, the method 100 enables both more efficient learning and execution of machine learning tasks related to environmental perception, thus serving as a specific improvement to computer-related technology. The method 100 may enable more memory-efficient, faster, more generalizable, and more compact representation of any automated computer-controlled system that interacts with its environment. The method 100 is not intended in any form to cover an abstract idea and may not be performed without a computing system.

The sensorimotor programs (SMPs) of the method 100 (also referred to as sensorimotor contingencies) embody behaviors that can be used to represent an agent's knowledge of the environment. Each sensorimotor program jointly represents one or more behaviors and an outcome. Each sensorimotor program additionally is capable of signaling its outcome (enabling a high-level sensorimotor program to execute and act based on the output of lower-level sensorimotor programs). The ability of SMPs to generate outcome signals enables the outcome signals to be compared with global truth during training, and enable rewards to be based not only on whether an SMP achieves a desired outcome but also on whether the SMP signals that outcome; e.g., if the SMP is achieving an outcome but does not signal properly the reward can be structured differently than if it achieves an outcome and signals properly. This is not possible in traditional reinforcement learning systems.

Two examples of sensorimotor programs include classification SMPs and bring-about SMPs. Classification SMPs perform actions in the environment to determine whether a concept is present in the environment or not. For example, a classification SMP may address the concept of "containment" (i.e., is the agent located within a bounded container, such as a fenced-in yard) and may signal "yes" or "no". Bring-about SMPs perform actions in the environment to bring about a particular state. For example, a bring-about SMP may attempt to bring about containment (e.g., if not already within a bound container, attempt to get into a bounded container). If the bring-about SMP is able to bring about containment, the SMP may signal "yes". SMPs may additionally or alternatively signal outcomes in any number of ways and in any manner.

SMPs may additionally or alternatively be constrained in any manner; for example, SMPs may terminate after a threshold number of processing steps is achieved or after a threshold time has elapsed.

In one implementation of an invention embodiment, SMPs may signal outcomes using trinary logic. In this implementation, a classification SMP may, for instance, signal an outcome of "1" if a concept is found to be true and a "−1" if a concept is found not to be true. If two outcomes are possible, why are three values needed? The reason: in some cases, it may be desirable to maintain a vector that stores, for each SMP, a record of the result returned by the SMP on last execution. In these cases, it may be further desirable to initialize the SMPs at a value that does not correspond to one of the two concepts (e.g., "0") so that the method 100 may effectively determine if a given SMP has been executed to completion since initialization.

SMPs of the method 100 may additionally or alternatively signal outcomes in any manner. Further, the systems executing the method 100 may maintain memory of SMP outcomes in any manner (or not at all).

S110 includes generating a sensorimotor training curriculum. S110 functions to generate a set of environments where each environment is associated with one or more concepts. These environments are then used to train sensorimotor programs (e.g., to classify based on or bring about the concepts). For each concept, S110 preferably generates a plurality of environments that represent the concept (additionally or alternatively, S110 may map concepts to environments in any manner).

S110 may generate the sensorimotor training curriculum in any manner. In one implementation of an invention embodiment, S110 generates the sensorimotor training curriculum for a set of concepts automatically by a rejection sampler working in tandem with a general-purpose constraint satisfaction problem (CSP) solver. Environment distributions may be specified in a fragment of first-order logic, using a pre-defined vocabulary of unary and binary predicates that can be combined using conjunction and negation. To generate environments, generators (e.g., conjunctions of first-order logic expressions that specify random samples) may be sampled uniformly; then the generator itself is invoked. For classification concepts, the concept filter is then used to filter generated environments into those that satisfy a given concept and those that do not. Then, these filtered environments are assigned a reward function. For example, for an environment with "Concept A" present, the reward function may reward +1 for SMPs that output a "1" signal (corresponding to concept present), a −1 for SMPs that output a "−1" signal (corresponding to concept not present), and 0 otherwise (e.g., if an SMP times out). Likewise, for an environment with "Concept A" not present, the reward function may reward +1 for SMPs that output a "−1" signal (corresponding to concept not present), a −1 for SMPs that output a "1" signal (corresponding to concept present), and 0 otherwise (e.g., if an SMP times out). For bring-about concepts, the concept filter evaluation may be performed dynamically (e.g., at each step of SMP execution, rewarding +1 if and only if the concept is true AND the concept has signaled appropriately and 0 otherwise).

Note that in general, reward functions for SMPs may be implemented in any manner. For example, a bring-about concept SMP may receive a reward if the concept is made true even if the SMP has not signaled correctly (e.g., at each step of SMP execution, rewarding +1 if the concept is true but the SMP has not properly signaled, +2 if the concept is true and the SMP has properly signaled, and 0 otherwise).

SMP training environments are preferably simulations of an environment for which utilization of sensorimotor programs are desired, but may additionally or alternatively be representative environments. For example, a set of SMPs intended to function only in virtual environments may utilize simpler variations of these virtual environments or (if possible) actual representative environments. A set of SMPs intended to function in real-world environments may utilize virtual simulations of those real-world environments (e.g., a set of SMPs intended to operate a robot arm may be trained on simulated visual data and physics); additionally or alternatively, such SMPs may be trained in a real-world environment (e.g., a physical environment that is reconfigured to represent various concepts).

Data used for generating or simulating environments may include images, video, audio, speech, medical sensor data, natural language data, financial data, application data, physical data, traffic data, environmental data, etc.

S120 includes specifying a concept relationship. S120 functions to establish relationships between concepts that can be exploited during training (and may aid in increasing generalizability even after training). As previously discussed, SMPs may be reused (i.e., SMPs may call each other) during and after training.

From a training perspective, it may be more efficient for SMPs to have an existing hierarchy (e.g., based on complexity) that determines what other SMPs a given SMP may call. Additionally or alternatively, a hierarchy may be used in specifying how SMPs are trained.

For example, as shown in FIGURE, a concept that classifies an SMP as "contained" in one dimension or not may call a first SMP that determines whether an SMP is bounded in a first direction and a second SMP that determines whether an SMP is bounded in the other direction—(if both SMPs signal "1" then so does the "contained" SMP). From a training perspective, it may be preferable to train SMPs in reverse order of such a hierarchy (e.g., train first SMPs that may not call other SMPs. Then train SMPs that may call those SMPs but no others, etc.). Alternatively stated, if the concept relationship for SMPs is top down in terms of complexity (e.g., low-complexity SMPs may call no other SMPs; medium-complexity SMPs may call low-complexity SMPs, high-complexity SMPs may call low- and medium-complexity SMPs) it may be preferable for training to occur bottom up (e.g., train low-complexity SMPs, then medium-complexity, then high-complexity).

If a hierarchy or other concept relationship that limits the available SMPs that an SMP may call exists, it may be based on complexity (as subjectively determined by a human) as in the previous example, but may additionally or alternatively be determined in any manner. However, the concept relationship established in S120 may simply be a flat relationship (e.g., there is no restriction on which SMPs an SMP may call; e.g., all SMPs may call each other). Note also that the concept relationships used for training need not be the same as the concept relationships used in executing a fully trained sensorimotor network (e.g., by S150), and that concept relationships may change over time. Likewise, while a concept relationship may be useful for directing training as in the above example, training need not be performed according to the concept relationship (e.g., it may still be that SMPs may only call less-complex SMPs during training, but instead of training the less-complex SMPs first, then the more-complex SMPs, it may be desirable to train all SMPs at the same time, or train more complex SMPs first).

Concept relationships may be specified manually, but they may additionally or alternatively be specified in any manner. For example, concept relationships may be determined automatically or partially automatically by the results of training on similar networks. Likewise, a concept relationship initially determined may be updated during SMP training based on the results of SMP training.

Note that as used in this document, a statement that a first concept is "higher-order" than a second concept is to be interpreted as specifying that the first concept may call the second concept, but the second concept may not call the first.

S130 includes training a first sensorimotor program and S140 includes training a second sensorimotor program using the first sensorimotor program. While S130 and S140 are substantially similar in function, the explicit mention of S140 highlights that training of SMPs to call other SMPs is an essential part of sensorimotor program training.

As previously mentioned, examples of SMPs include classification and bring-about SMPs. Classification SMPs are preferably trained using reward functions that reward the SMP when the SMP terminates within a set time or number of steps and correctly returns a value consistent with the presence or non-presence of a given concept in an environment. Bring-about SMPs are preferably trained using reward functions that reward the SMP when the SMP successfully brings about a given environmental state, terminates within a set time or number of steps, and correctly returns a value indicating that the SMP has successfully brought about the given environmental state. SMPs may additionally or alternatively be rewarded in any manner. For example, bring-about SMPs may receive shaping awards when an SMP successfully brings about a concept but does not appropriately signal. The shaping reward may, for instance, provide a smaller reward than the primary reward function. Note that bring-about SMPs may call classification SMPs and vice-versa.

SMPs may be trained in any manner. In one implementation of an invention embodiment, sets of SMPs may be represented by a neural network (e.g., a gated recurrent unit (GRU) network) and trained using natural policy optimization (NPO). Networks may likewise be initialized in any manner, and training may occur over any number of iterations. For example, a given SMP may be trained and evaluated for five different random seeds. When an SMP reuses another SMP, that other SMP may be selected in any manner (e.g., the best performing seed may be selected, one of the seeds may be selected at random, etc.).

SMPs preferably may call other SMPs as an option (e.g., reusing an SMP to perform some set of actions) or as observations (e.g., where the SMP makes use of the output of SMPs it calls, not just the set of actions performed by it).

In addition to other SMPs, an SMP may perform any one of a set of primitive actions. For example, for an SMP controlling a robot arm, primitive actions may include simple movement of the robot arm (e.g., move up, move down, rotate hand, etc.). Other examples of primitive actions may be those related to the control of sensors, actuators, or processing modules; for example, the orientation of a camera, the focus of the camera, values recorded by touch sensors, etc. In general, primitive actions are preferably pure motor or sensory actions (rather than the concepts that are derived from motor and sensory interaction), but primitive actions may be any "base-level" action (i.e., an action that may not call an SMP but rather serves as building block for an SMP).

SMPs are trained to accomplish a concept. For example, a classification concept example is the "containment" classification (i.e., determine if the agent is contained or not) and a bring-about concept example is bringing-about containment (i.e., bring the agent to a contained state if possible).

S150 includes executing the first and second sensorimotor programs. S150 functions to allow the use of the sensorimotor programs trained in S110-S140 to accomplish a task or determine an environmental state. S150 preferably includes executing the second SMP, and in the process of executing the second SMP, executing the first SMP (e.g., reusing the first SMP as previously described in the method 100.

Note that if the first and second sensorimotor programs are trained using a simulation of a real world environment, execution may occur using physical sensors and actuators (e.g., on a robot).

The methods of the preferred embodiment and variations thereof can be embodied and/or implemented at least in part as a machine configured to receive a computer-readable medium storing computer-readable instructions. The instructions are preferably executed by computer-executable components preferably integrated with a neural network. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

I claim:

1. A method for establishing sensorimotor programs comprising:
   generating a first plurality of environments that represent a first concept, wherein the first concept is a bring-about concept;
   generating a second plurality of environments that represent a second concept;
   specifying a concept relationship that relates the first concept to the second concept and establishes the second concept as higher-order than the first concept;
   training, using the first plurality of environments, a first sensorimotor program to accomplish the first concept using a set of primitive actions; and
   training, using the second plurality of environments, a second sensorimotor program to accomplish the second concept using the first sensorimotor program and the set of primitive actions;
   wherein generating the first and second pluralities of environments comprises generating the first and second pluralities of environments using a rejection sampler in tandem with a general-purpose constraint satisfaction problem (CSP) solver; and
   wherein training the first sensorimotor program to accomplish the first concept comprises training the first sensorimotor program using a first reward function that rewards when the first sensorimotor program successfully brings about the first concept and correctly returns a value indicating that the first sensorimotor program has successfully brought about the first concept.

2. The method of claim 1, wherein the first and second sensorimotor program are trained serially from lower-order to higher-order.

3. The method of claim 1, wherein the first and second sensorimotor program are trained in parallel.

4. The method of claim 1, further comprising executing the first and second sensorimotor programs on a system with at least one physical actuator.

5. The method of claim 1, wherein specifying the concept relationship comprises specifying the concept relationship manually.

6. The method of claim 1, wherein specifying the concept relationship comprises specifying the concept relationship manually initially and then updating the concept relationship automatically based on results of training the first sensorimotor program.

7. The method of claim 1, wherein the second concept is a classification concept or a bring-about concept.

8. The method of claim 7, wherein the second concept is a classification concept; wherein training the second sensorimotor program to accomplish the second concept comprises training the second sensorimotor program using a reward function that rewards when the second sensorimotor program correctly returns a value consistent with the presence or non-presence of the second concept in a training environment.

9. The method of claim 1, wherein training the first sensorimotor program to accomplish the first concept further comprises training the first sensorimotor program using a second reward function that rewards when the first sensorimotor program successfully brings about the first concept but fails to return a value indicating that the first sensorimotor program has successfully brought about the first concept; wherein the second reward function is a shaping reward function.

10. The method of claim 9, wherein the first reward function provides a greater reward than the second reward function.

11. The method of claim 1, wherein the first and second sensorimotor programs are represented by a neural network and training the first and second sensorimotor programs comprises training the first and second sensorimotor programs using natural policy optimization.

12. The method of claim 11, wherein training the first sensorimotor program comprises training the first sensorimotor program on a set of random seeds.

13. The method of claim 12, wherein training the second sensorimotor program comprises training the second sensorimotor program using the first sensorimotor program for a subset of the set of random seeds; wherein the subset is selected from the set based on performance for each of the set of random seeds.

14. The method of claim 1, wherein the second sensorimotor program calls the first sensorimotor program as an observation.

15. The method of claim 1, wherein the first and second sensorimotor programs return outcomes using trinary logic; wherein a first bit corresponds to a concept being present, a second bit corresponds to a concept not being present, and a third bit corresponds to a state in which the concept has not yet been determined to be present or not present.

16. The method of claim 1, further comprising executing the first and second sensorimotor programs on a system with at least one physical actuator.

17. The method of claim 16, wherein the at least one physical actuator is a robotic arm actuator; wherein one of the primitive actions actuates the robotic arm actuator.

* * * * *